(No Model.) 2 Sheets—Sheet 1.
W. F. M. McCARTY.
METHOD OF MANUFACTURING HEATING AND ILLUMINATING GAS.
No. 343,524. Patented June 8, 1886.
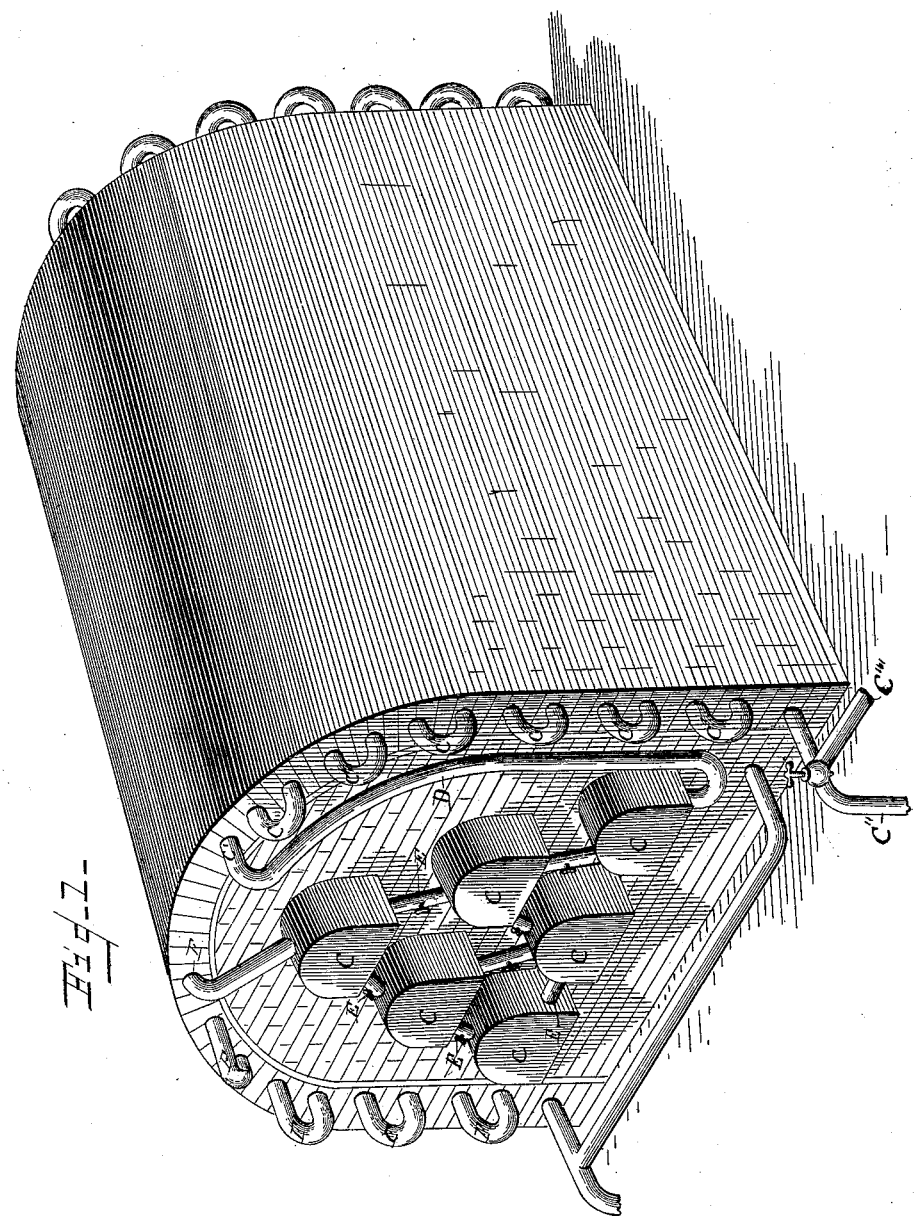
WITNESSES
Edwin L. Yewell,
W. E. Chaffee
INVENTOR
W. F. M. McCarty
By
L. W. Ginsabaugh
Attorney (No Model.) 2 Sheets—Sheet 2.
W. F. M. McCARTY.
METHOD OF MANUFACTURING HEATING AND ILLUMINATING GAS.
No. 343,524. Patented June 8, 1886.
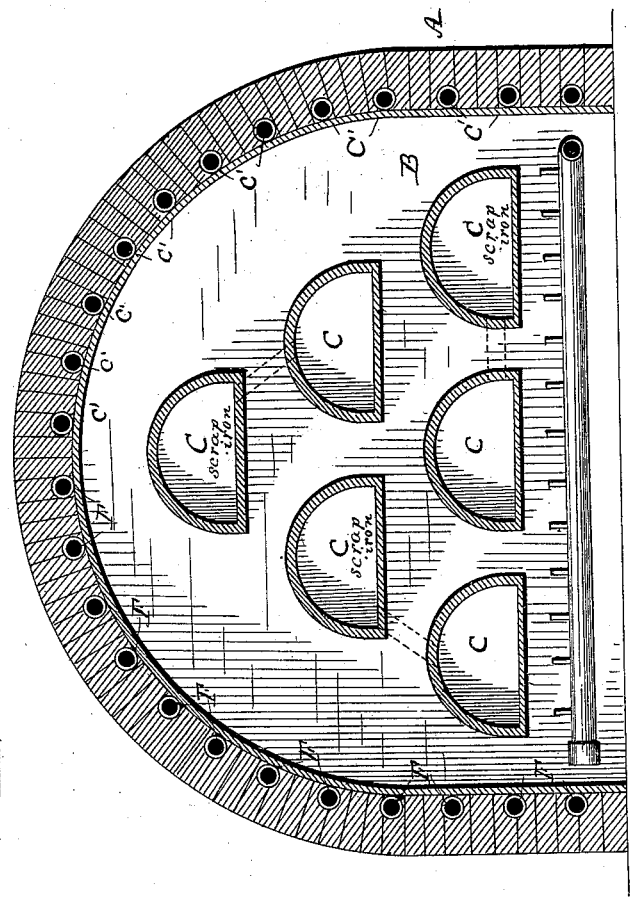
WITNESSES
Edwin L. Yewell.
W. E. Chaffee
INVENTOR
W. F. M. McCarty
By
S. H. Ginsabaugh
Attorney

United States Patent Office.

WILLIAM F. M. McCARTY, OF PHILADELPHIA, PENNSYLVANIA, ASSIGNOR TO JANE LOGAN, OF HAGERSTOWN, MARYLAND, AND ADOLPH OHL AND BERNARD C. LAUTH, OF PHILADELPHIA, PENNSYLVANIA.

METHOD OF MANUFACTURING HEATING AND ILLUMINATING GAS.

SPECIFICATION forming part of Letters Patent No. 343,524, dated June 8, 1886.

Application filed November 25, 1885. Serial No. 183,935. (No specimens.)

*To all whom it may concern:*

Be it known that I, WILLIAM F. M. McCARTY, a citizen of the United States, residing at Philadelphia, in the county of Philadelphia and State of Pennsylvania, have invented certain new and useful Improvements in the Method of Manufacturing Heating and Illuminating Gas, of which the following is a specification, reference being had therein to the accompanying drawings.

My invention relates to certain improvements in the manufacture of gas; and it has for its objects to produce a gas for general purposes, and which may be brought to any desired illuminating standard or candle-power by the utilization of natural gas in conjunction with carbonic-oxide and other gases and a suitable hydrocarbon, when necessary, as will be more fully hereinafter set forth.

My invention consists in first heating the natural gas to a high temperature, in order to expand it to its greatest tension, then admitting and combining with it carbonic-oxide gas in conjunction with the other gases, constituting water-gas; then subjecting the mixed gases to the action of iron intensely heated, and then, if necessary, combining with the highly-heated gases any suitable hydrocarbon in the form of vapor, and, finally, converting the whole into a permanent or fixed gas.

In carrying out my invention the natural gas is first heated in any convenient manner to a temperature sufficient to expand it to its greatest tension, and while in this condition or before it is heated carbonic-oxide gas is admitted and combined with it. The carbonic oxide, in connection with free hydrogen and carbonic acid, may be produced in any convenient manner, but is preferably made by passing steam or water over carbon either in the form of coke, charcoal, or any solid hydrocarbon that will cause the desired decomposition in an intensely-heated state. The combined gases in their highly-heated state are then passed into intimate contact with iron, preferably scrap-iron or other suitable material, heated to about 1,500°, the iron taking up all or a portion of the oxygen of the carbonic acid, the portion remaining forming, with the excess of hydrogen, water, which is condensed and separated from the gases, thus freeing the same of carbonic acid, which is a highly-objectionable gas. A portion of the free carbon combines with the natural gas, forming acetylene, a gaseous hydrocarbon of considerable illuminating-power. When it is required to enhance the illuminating-power of the combined gases, any suitable hydrocarbon may be admitted at this stage of the operation, and the combined gases and vapors are finally fixed by further heating, forming a permanent gas of the desired quality. Any suitable apparatus may be employed in carrying out my invention; but I prefer to use the devices shown in the accompanying drawings, in which—

Figure 1 is a view in perspective of a furnace used in carrying out my process. Fig. 2 is a sectional view of the same.

In the said drawings, A indicates the walls of the furnace, which may be constructed of masonry or any other suitable material, and B the fire-chamber of the same.

C indicates a bench or series of retorts of the usual or any approved construction, arranged in the form shown.

Around the inside of the furnace, at one side, are arranged a series of pipes, C', connected alternately at opposite ends by return bends or couplings, so as to form a continuous passage for the mixed gases—that is, the natural gas and carbonic oxide, which are admitted in proper proportions and quantities to the lower end of the series of pipes through the pipes C'' C''', and pass upward through the series, being heated during their passage. The upper pipe of the series, which is located under the crown of the furnace, is connected by means of a pipe, D, with one of the lower series of retorts, C. These retorts are connected alternately at opposite ends by the pipes E, and are each filled with scrap-iron. The hot combined gases pass into the retorts and through the scrap-iron, whereby the decomposition and removal of the carbonic acid is effected. The upper retorts of the series connect with the upper pipe of the series F, which extend along the inside of the furnace similar to and on the side opposite the pipes C', before mentioned. The combined gases pass off through the said pipes F, wherein they are finally fixed, and from thence the permanent gas is passed to the holder. When a gas of high illuminating standard is desired, a suitable hydrocarbon is admitted in the form of vapor to one or more of the retorts, where it is decomposed, forming olefiant gas ($C_2H_4$,) which combines with the mixed gases before mentioned, and is fixed with them at the final stage of the process; but it will generally prove preferable to produce a heavier gas, which may be expressed by the formula $C_2H_2$. After the final permanent gas is produced, a portion of it may be conducted to suitable burners arranged under the retorts in the furnace to heat the same.

I am aware that natural gas and other gases have been heated under pressure and decomposed in a suitable conduit, and this I do not claim.

Having thus described my invention, what I claim, and desire to secure by Letters Patent, is—

1. The process herein described of producing a permanent gas, the same consisting in heating natural gas and expanding it to its greatest tension in conjunction with water-gas, and passing the mixed gases over scrap-iron, whereby the carbonic acid is decomposed and acetylene substituted therefor, substantially as specified.

2. The process herein described of producing an illuminating-gas of a high illuminating standard, the same consisting in heating natural gas in conjunction with water-gas, passing the mixed gases through intensely-heated and finely-divided iron, and finally combining with the mixed and purified gases a suitable hydrocarbon in the form of vapor, and fixing the whole to form a permanent gas, substantially as specified.

In testimony whereof I affix my signature in presence of two witnesses.

WM. F. M. McCARTY.

Witnesses:
WM. H. DE LACY,
L. W. SINSABAUGH.